(12) United States Patent
Chan et al.

(10) Patent No.: US 7,247,959 B2
(45) Date of Patent: Jul. 24, 2007

(54) DYNAMOELECTRIC MACHINE WITH ARCUATE HEAT EXCHANGER AND RELATED METHODS

(75) Inventors: King Wai Chan, Chuluota, FL (US); Homer Gay Hargrove, Maitland, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 580 days.

(21) Appl. No.: 10/269,955

(22) Filed: Oct. 11, 2002

(65) Prior Publication Data

US 2004/0070291 A1 Apr. 15, 2004

(51) Int. Cl.
*H02K 9/00* (2006.01)
(52) U.S. Cl. .......................................... 310/59; 310/58
(58) Field of Classification Search ............ 310/52–64; 165/163, 179, 184, 149
See application file for complete search history.

(56) References Cited

U.S. PATENT DOCUMENTS

| | | | | |
|---|---|---|---|---|
| 2,176,406 A | * | 10/1939 | McCullough | 165/149 |
| 2,460,752 A | * | 2/1949 | Jacobsen | 310/57 |
| 2,707,243 A | | 4/1955 | Baudry et al. | 310/57 |
| 2,789,238 A | * | 4/1957 | Staak | 310/57 |
| 2,820,617 A | | 1/1958 | Tadewald | 257/262.18 |
| 2,887,593 A | * | 5/1959 | Wiedemann | 310/58 |
| 3,091,710 A | * | 5/1963 | Shartrand et al. | 310/57 |
| 3,127,530 A | * | 3/1964 | White | 310/54 |
| 3,457,439 A | * | 7/1969 | Gering et al. | 310/52 |
| 3,619,674 A | | 11/1971 | Daimo et al. | 310/54 |
| 3,751,699 A | | 8/1973 | Gleichman | 310/90 |
| 3,789,249 A | | 1/1974 | Purman | 310/54 |
| 3,939,368 A | | 2/1976 | Albaric et al. | 310/59 |
| 3,968,389 A | | 7/1976 | Albaric et al. | 310/61 |
| 4,163,163 A | | 7/1979 | Gurevich et al. | 310/59 |
| 4,213,498 A | * | 7/1980 | Vandenbossche | 165/169 |
| 4,264,834 A | * | 4/1981 | Armor et al. | 310/55 |
| 4,394,593 A | | 7/1983 | Gocho | 310/54 |
| 4,500,772 A | | 2/1985 | Ahner et al. | 219/209 |
| 4,508,985 A | | 4/1985 | Pavlik et al. | 310/55 |
| 5,038,854 A | * | 8/1991 | Peterson, III | 165/76 |
| 5,473,207 A | | 12/1995 | Hopeck et al. | 310/65 |
| 5,785,114 A | | 7/1998 | Armstrong et al. | 165/47 |

(Continued)

FOREIGN PATENT DOCUMENTS

DE 2423853 11/1975

(Continued)

OTHER PUBLICATIONS

Patent Abstracts of Japan, vol. 1995, No. 08, Sep. 29, 1995 and JP 07 123647A (Hitachi Ltd.), May 12, 1995.

(Continued)

*Primary Examiner*—Dang Le

(57) ABSTRACT

A dynamoelectric machine 30 includes a rotor 32 and a stator 34 surrounding the rotor. The dynamoelectric machine 30 further includes a generator housing 36 surrounding both the rotor 32 and the stator 34. Additionally, the dynamoelectric machine 30 includes at least one blower 39a, 39b for generating a cooling gas flow 38 within the generator housing 36 to cool the stator 34 and the rotor 32. The dynamoelectric machine 30 includes at least one arcuate heat exchanger 40a, 40b, 80a, 80b within the generator housing 36 for extracting heat from the cooling gas flow 38.

14 Claims, 4 Drawing Sheets

U.S. PATENT DOCUMENTS

| | | | | |
|---|---|---|---|---|
| 5,844,333 A | * | 12/1998 | Sheerin | 310/52 |
| 6,268,668 B1 | | 7/2001 | Jarczynski et al. | 310/52 |
| 6,300,693 B1 | | 10/2001 | Poag et al. | 310/54 |
| 6,313,556 B1 | | 11/2001 | Dombrovski et al. | 310/91 |
| 6,329,731 B1 | | 12/2001 | Arbanas et al. | 310/52 |
| 6,343,646 B1 | * | 2/2002 | Martins | 165/151 |

FOREIGN PATENT DOCUMENTS

| | | | |
|---|---|---|---|
| DE | 2951860 | | 7/1981 |
| DE | 20107972 U1 | | 7/2001 |
| EP | 1248349 A2 | | 10/2002 |
| JP | 52009807 A | * | 1/1977 |

OTHER PUBLICATIONS

Patent Abstracts of Japan, vol. 018, No. 335 (M-1627), Jun. 24, 1994 and JP 06 080027 A (Shin Caterpillar Mitsubishi Ltd).

Patent Abstracts of Japan, vol. 018, No. 465 (M-1665), Aug. 30, 1994 and JP 06 146877 A (Showa Alum Corp), May 27, 1994.

* cited by examiner

DYNAMOELECTRIC MACHINE WITH ARCUATE HEAT EXCHANGER AND RELATED METHODS

FIELD OF THE INVENTION

The present invention relates to the field of dynamoelectric machines and, more particularly, to gas-cooled dynamoelectric machines.

BACKGROUND OF THE INVENTION

A dynamoelectric machine, such as an electric power generator, includes a rotor, a stator surrounding the rotor, and a generator housing surrounding the rotor and stator. The generator produces electrical current as the rotor turns within the stator. The electrical current flows through respective windings mounted on the rotor and stator, and generates heat that may be dissipated away from the rotor and stator for greater generator efficiency and/or reliability.

One technique for cooling the rotor and stator is to circulate a cooling gas within the generator housing. The circulating gas removes heat from the rotor and stator windings. A gas-to-liquid cooler within the generator housing may be used to transfer the heat from the gas to a liquid coolant flowing through the cooler.

Some gas-cooled generators use coolers that extend horizontally in parallel with the axis of the rotor and stator. Although horizontal coolers are still used, later-designed gas-cooled generators typically incorporate one or more coolers positioned vertically within a generator housing. U.S. Pat. No. 2,707,243 to Baudry et al., for example, discloses a pair of vertical coolers positioned between a stator-winding duct and a housing bracket at the end of an electrical generator.

Both types of coolers—horizontal and vertical—are typically rectangularly shaped. U.S. Pat. No. 5,785,114 to Armstrong et al., for example, discloses a cooler that can be positioned either horizontally or vertically, but like other conventional coolers, it is rectangular. Specifically, the cooler comprises a rectangular cooler frame and a plurality of straight, elongate cooling tubes within the rectangular cooler frame.

Horizontal and vertical rectangular coolers pose a number of distinct disadvantages in cooling a dynamoelectric machine, such as an electrical power generator. For example, because a generator typically is positioned on a frame within the generator housing, the frame normally is irregularly shaped and has an enlarged diameter to accommodate the horizontal or vertical rectangular cooler. The result is an increase in the costs of manufacturing and transporting such a dynamoelectric machine.

In cooling such a machine, moreover, the gas is directed away from the generator and toward the cooler, after heat has been transferred from the generator to the circulating gas. Similarly, after the gas has been cooled by the transfer of heat to the coolant within the cooler, the gas is directed to an inlet of a blower to redirect the gas toward the generator to maintain circulation of the cooling gas. With rectangular horizontal or vertical coolers, internal baffles are used to direct heated gas away from the generator and to direct cooled gas to the blower inlet.

Although needed to properly direct the circulating gas, the internal baffles result in greater gas pressure losses. The loss of gas pressure caused by the internal baffles lowers the efficiency of the dynamoelectric machine and typically requires the use of larger blowers to overcome the loss. Not only is the operating efficiency of the dynamoelectric machine reduced as a result, but so, too, the cost of manufacturing is increased owing to the need to install the internal baffles and larger blowers.

SUMMARY OF THE INVENTION

With the foregoing background in mind, it therefore is an object of the present invention to provide a more efficiently cooled dynamoelectric machine.

This and other objects, features, and advantages in accordance with the present invention are provided by a dynamoelectric machine comprising a rotor, a stator surrounding the rotor, a generator housing surrounding the rotor and stator, at least one blower for generating a cooling gas flow within the generator housing, and at least one arcuate heat exchanger within the generator housing for extracting heat from the cooling gas flow.

The arcuate heat exchanger may be more readily positioned within the path of the cooling gas flow to thereby more efficiently extract heat therefrom. The positioning of the arcuate heat exchanger, moreover, may reduce reliance on baffling for directing the cooling gas flow within the generator housing. Relatedly, because the total blower head requirement is accordingly lower, the arcuate heat exchanger thus may be used in conjunction with smaller sized blowers. The reduced baffling and smaller blower size, in turn, also may allow the size of the generator housing to be accordingly smaller. As a result, the cooling efficiency of the arcuate heat exchanger may be significantly enhanced. The arcuate heat exchanger may more readily conform to the contours of the generator housing, permitting the size of the arcuate heat exchanger to be larger, thereby further improving its cooling performance. The smaller size of the generator and reduced use of baffling also may lower manufacturing and transportation costs associated with the dynamoelectric machine.

The at least one arcuate heat exchanger of the dynamoelectric machine may be generally annular, for example. The at least one arcuate heat exchanger may comprise a bundle of coolant tubes for carrying a coolant. The coolant may be a liquid coolant. The at least one arcuate heat exchanger also may comprise a pair of spaced-apart plates with the cooling tubes extending therebetween. The spaced-apart plates, moreover, may be spaced apart axially from each other in some embodiments. Alternately, the at least one arcuate heat exchanger may comprise a pair of spaced-apart plates wherein the plates are radially spaced apart from one another.

The bundle of coolant tubes may comprise tubes having cooling fins extending outwardly therefrom. They may provide better heat transfer.

The dynamoelectric machine may comprise at least one arcuate heat exchanger that surrounds the stator of the dynamoelectric machine. The dynamoelectric machine, moreover, may alternately or additionally comprise at least one arcuate heat exchanger that is adjacent an end of the stator. More particularly, some embodiments may include a first pair of arcuate heat exchangers, each of the pair being adjacent an opposite end of the stator, along with a second pair of arcuate heat exchangers surrounding the stator.

Another aspect of the invention relates to a method of extracting heat from a cooling gas flow within a generator housing to thereby cool a rotor and a stator surrounding the rotor. The method may comprise positioning at least one arcuate heat exchanger within the housing, and causing a coolant to flow within the arcuate heat exchanger to extract heat from the cooling gas flow.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
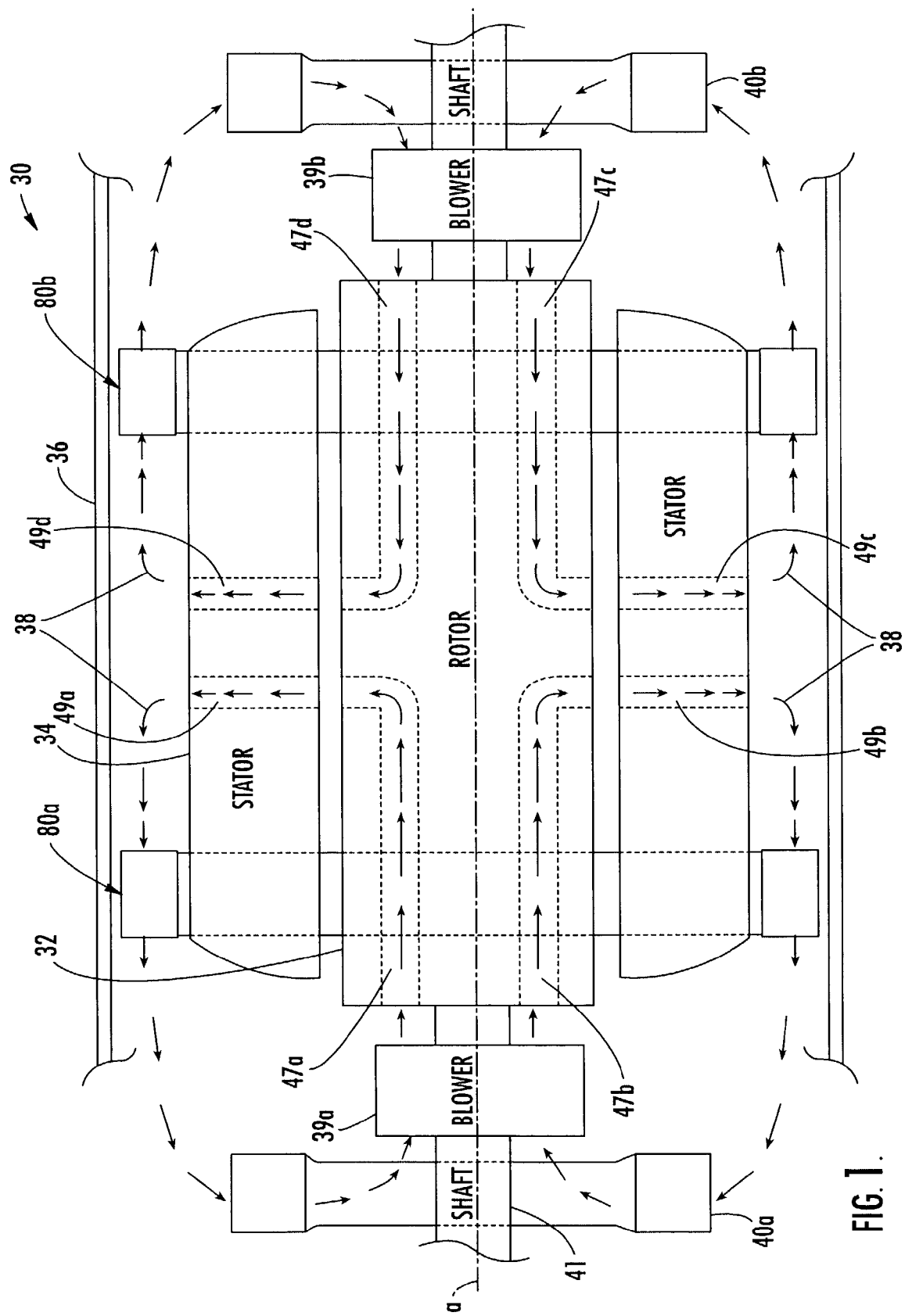
FIG. 1 is a schematic diagram of a dynamoelectric machine according to the invention.

With initial reference to FIG. 1, a more efficiently cooled dynamoelectric machine 30 according to the present invention is described. The dynamoelectric machine 30 illustratively comprises a rotor 32, a stator 34 surrounding the rotor, and a generator housing 36 surrounding both the rotor and the stator. A gas flow 38 circulates within the generator housing 36 to cool the rotor 32 and stator 34. The gas flow is illustratively generated by a pair of blowers 39a, 39b positioned at opposing ends of the rotor 32 and stator 34. As schematically shown, the blowers 39a, 39b are mounted on and driven by a shaft 41 that connects to the rotor 32 to also drive the rotor.

The dynamoelectric machine 30 further comprises a first pair of arcuate heat exchangers 40a, 40b adjacent opposing ends of the stator 34 and a second pair of arcuate heat exchangers 80a, 80b that surround portions of the stator 34. Although illustratively the dynamoelectric machine 30 thus includes two pairs of arcuate heat exchangers 40a, 40b and 80a, 80b, it will be apparent to one skilled in the art from the description herein that alternately the dynamoelectric machine 30 may include more than four arcuate heat exchangers, less than four arcuate heat exchangers, and, indeed, as few as one arcuate heat exchanger.

Figure 2:
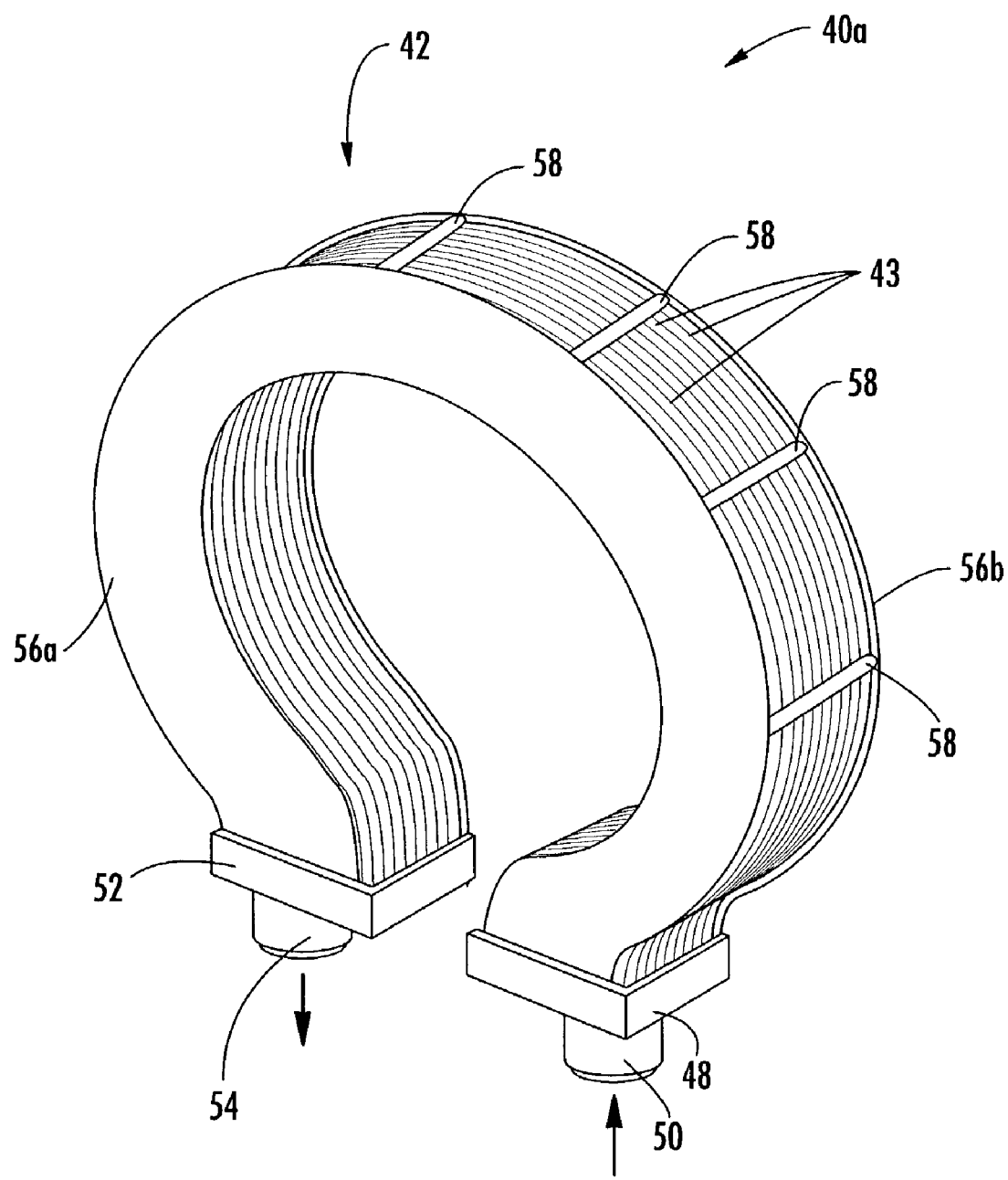
FIG. 2 is a perspective view of an arcuate heat exchanger as shown in FIG. 1.

Turning now additionally to FIG. 2, an arcuate heat exchanger 40a representative of the first pair of arcute heat exchangers 40a, 40b is described in greater detail. Because each of the first pair of arcuate heat exchangers 40a, 40b is similar, the description of the one will suffice to explain the other. Illustratively, the arcuate heat exchanger 40a comprises a bundle 42 of parallel coolant tubes 43. Each coolant tube 43 is elongate, having opposing ends that are illustratively spaced apart from and adjacent one another so that the portion of the tube between the ends is arcuate. As illustrated, the arcuate portion of each coolant tube 43 forms a nearly complete ring, with the opposing ends only slightly spaced apart to thereby give the arcuate heat exchanger 40a a generally annular shape.

As will be readily apparent to those skilled in the art, the opposing ends of each coolant tube 43 alternately can be more widely spaced apart to create an arcuate heat exchanger 40a having an inverted U-shape. The arcuate heat exchanger 40a alternately can take on other arcuate configurations that will readily come to the mind of one skilled in the art.

Although arcuate portions of each coolant tube 43 are illustrated as being smoothly arcuate, it will be readily appreciated by those skilled in the art that each may alternately include non-smooth or non-curved portions as well. Indeed, as will be apparent to those skilled in the art, each coolant tube 43 may alternately entirely comprise a plurality of straight, linear portions that are connected at angles relative to one another so as to have, in the aggregate, an arcuate shape.

A first end of each coolant tube 43 is illustratively connected to an inlet manifold 48, and a second end is connected to an outlet manifold 52. An inlet 50 is connected to the inlet manifold 48 so that a coolant can be supplied through the inlet into the inlet manifold, which directs the coolant into respective coolant tubes of the bundle 42 of coolant tubes 43 as will be readily understood by those skilled in the art. Other means of supplying coolant will also be envisioned by those skilled in the art. For example, the coolant tubes 43 may include reverse chambers and a water box may connected along an arcuate portion to the coolant tubes 43 to supply water thereto, with separate halves working independently of one another.

An outlet 54 is connected to the outlet manifold 52, and the coolant can be received from the coolant tubes 43 via the outlet. Accordingly, as will be readily appreciated by those skilled in the art, a flow of coolant can be made to circulate within the bundle 42 of coolant tubes 43 of the arcuate heat exchanger 40a. When the gas flow 38 comes into contact with the arcuate heat exchanger 40a, heat is transferred from the gas to the coolant within the bundle 42 of coolant tubes 43.

The arcuate heat exchanger 40a further comprises a pair of spaced-apart plates 56a, 56b. A plurality of braces 58 illustratively extend between the spaced-apart plates 56a, 56b. The bundle 42 of coolant tubes 43, as illustrated, are adjacent the spaced-apart plates 56a, 56b, and, more particularly, extend between them. As illustrated, each arcuate heat exchanger 40a, 40b has its plates 56a, 56b being axially spaced apart based upon the axis a of the generator so that the gas flow 38 is parallel to the spaced-apart plates and radially inward.

Figure 3:
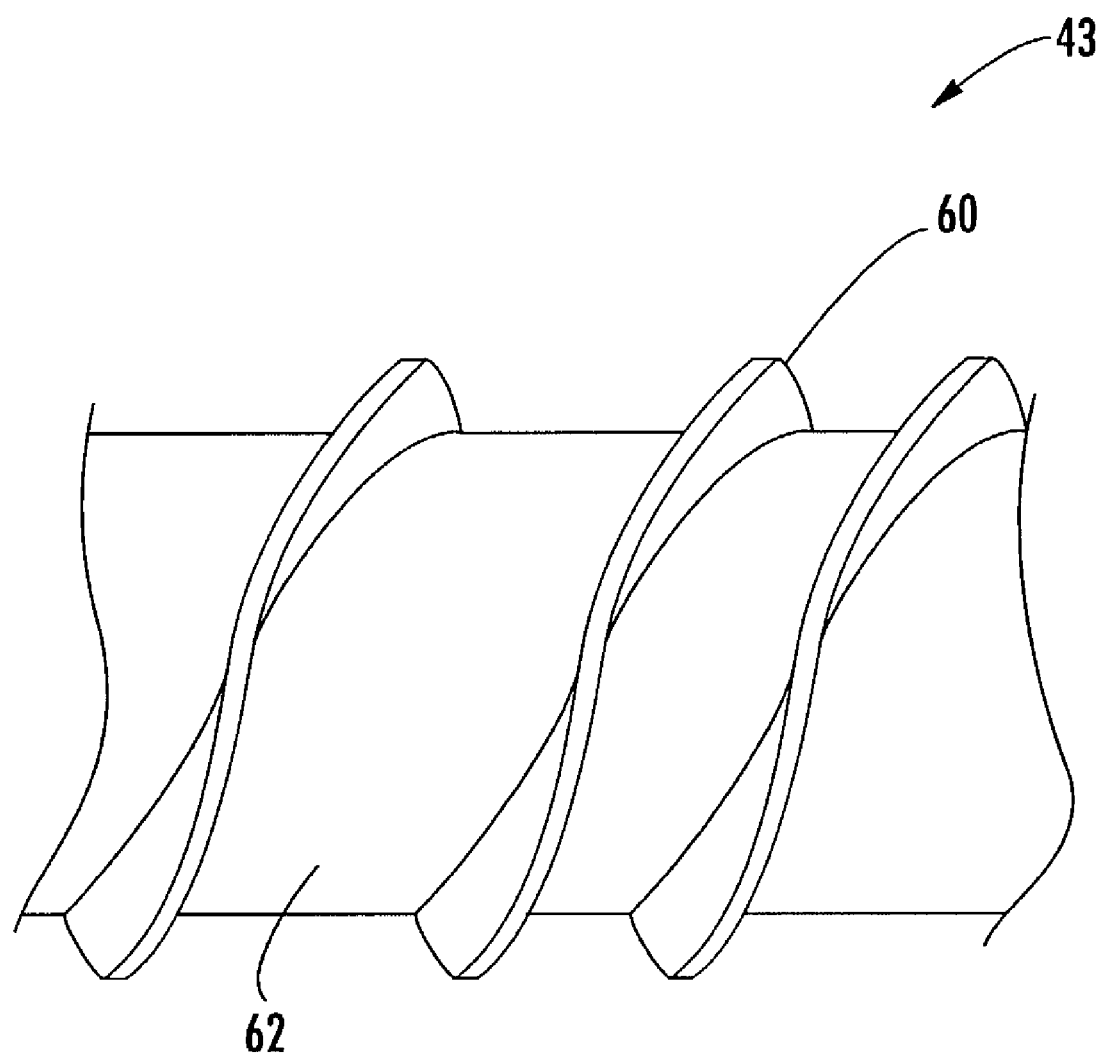
FIG. 3 is a perspective view of a portion of a coolant tube of the arcuate heat exchanger illustrated in FIG. 2.

As shown in FIG. 3, the arcuate heat exchanger 40a may further comprise fins 60 extending outwardly from each of the tubes 43 to thereby more effectively extract heat from the cooling gas flow 38 by providing greater surface area for contacting the cooling gas flow. The fins 60 may extend outwardly from a surface portion 62 in a spiral configuration. As will be readily understood by those skilled in the art, the fins alternately may be flat-wound rather than spiraled. Moreover, although, fins enhance heat exchange, there may be reasons not to use fins (e.g., to reduce manufacturing costs). Accordingly, as will be readily appreciated by one skilled in the art, the arcuate heat exchanger 40a alternately may be devoid of such fins.

Figure 4:
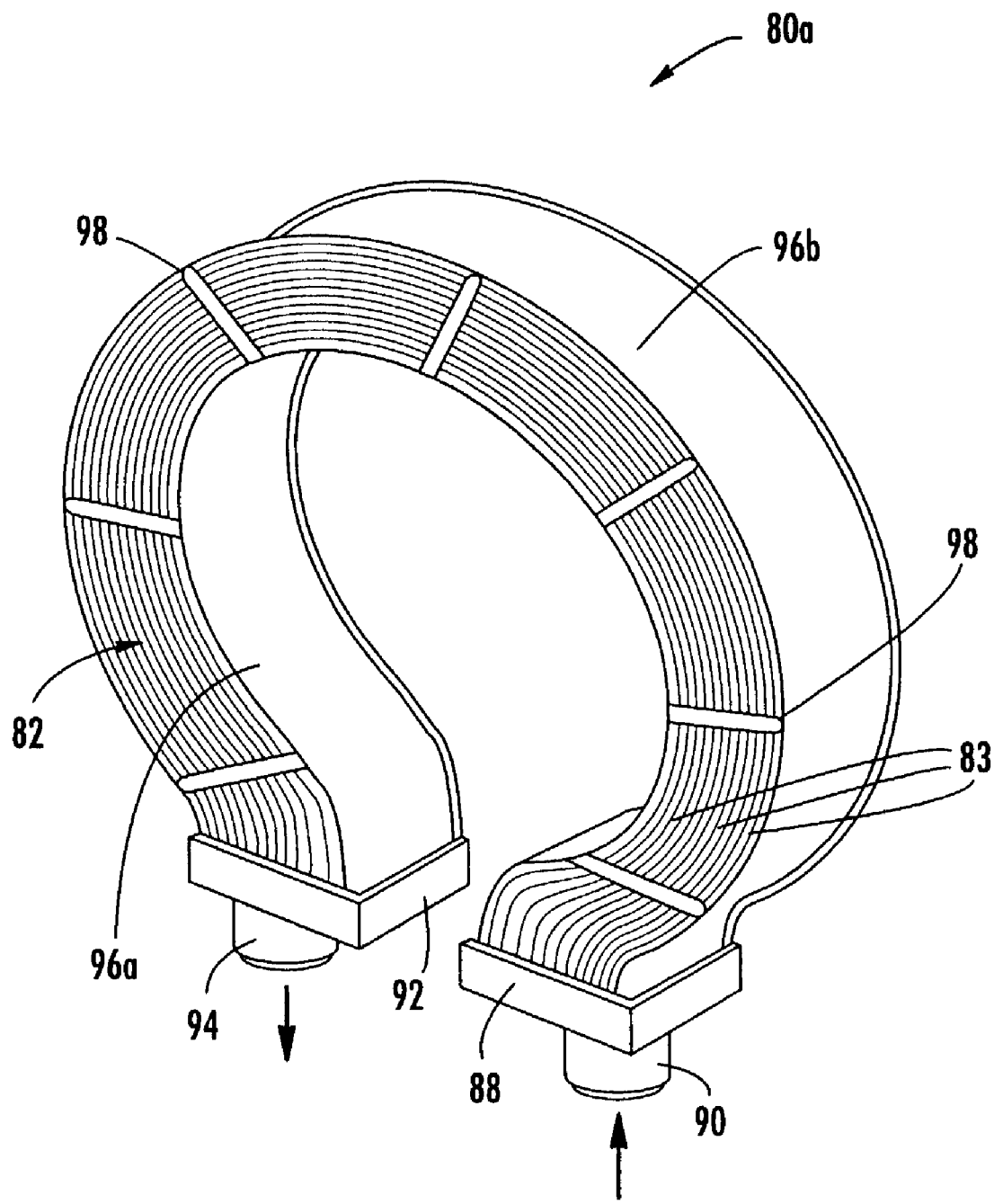
FIG. 4 is perspective view of another arcuate heat exchanger shown in FIG. 1.

Referring additionally now to FIG. 4, the second pair of arcuate heat exchangers 80a, 80b is described in terms of a representative arcuate heat exchanger 80a. Again, because each of the second pair of arcuate heat exchangers 80a, 80b is similar, the description of the one will suffice to describe the other.

The arcuate heat exchanger 80a representative of the second pair of arcuate heat exchangers 80a, 80b comprises a bundle 82 of parallel coolant tubes 83. Each coolant tube 83 comprises opposing ends with an elongated arcuate portion therebetween. A first end of each coolant tube 83 connects to an inlet manifold 88, and a second end connects to an outlet manifold 92. An inlet 90 connects to the inlet manifold 88 to supply a coolant thereto, and an outlet 94 connects to the outlet manifold 92 to receive the coolant therefrom.

As noted above in the context of the first pair of arcuate heat exchangers 40a, 40b, even though arcuate portions of each coolant tube 83 of the second pair of arcuate heat exchangers 80a, 80b are shown as being smoothly arcuate, it should be apparent to those skilled in the art that they may alternately include non-smooth or non-curved portions instead. And, indeed, as also noted above, each coolant tube 83 may instead entirely comprise a plurality of straight, linear portions that are connected at angles relative to one another so as to have an arcuate shape when taken together.

The arcuate heat exchanger 80a further illustratively comprises a pair of spaced-apart plates 96a, 96b. The bundle 82 of coolant tubes 83 are adjacent the spaced-apart plates 96a, 96b, extending therebetween. A plurality of braces 98 illustratively extend between the spaced-apart plates 96a, 96b. The spaced-apart plates 96a, 96b are spaced apart radially. The gas flow 38 contacts the bundle 82 of coolant tubes 83 as it flows between the radially spaced-apart plates 96a, 96b.

The arcuate heat exchangers 40a, 40b, 80a, 80b provide significant advantages over conventional heat exchangers. For example, the arcuate heat exchangers 40a, 40b, 80a, 80b can more readily conform to the shape of an electrical power generator. Moreover, the shape of the arcuate heat exchangers 40a, 40b, 80a, 80b allows them to be readily positioned within the generator housing 36 of the dynamoelectric machine 30.

The arcuate heat exchangers 40a, 40b, 80a, 80b can increase cooling efficiency since the arcuate heat exchangers can be readily positioned within the path of the gas flow 38. The positioning can provide for better heat exchange between the gas flow 38 and a coolant, and, as a result, better cooling of the dynamoelectric machine 30.

Being able to more readily position the arcuate heat exchangers 40a, 40b, 80a, 80b within the path of the gas flow 38, moreover, reduces the need for internal baffling to direct the gas flow 38 to and from the arcuate heat exchangers. It also allows for use of smaller sized blowers 39a, 39b, because, as will be readily appreciated by those skilled in the art, the total blower head requirement is lower owing to the better positioning of the arcuate heat exchangers 40a, 40b, 80a, 80b.

Therefore, the efficiency of the dynamoelectric machine 30 is enhanced by the lower blower loss and better cooling capabilities. Use of the arcuate heat exchanger 40a, 40b, 80a, 80b also reduces manufacturing and transportation costs associated with the dynamoelectric machine 30 as compared to conventional generators. Conventional generator housings are normally designed to have a more rectangular shape along with an enlarged diameter to accommodate rectangularly shaped horizontal and vertical coolers.

As already noted, the dynamoelectric machine 30 illustratively comprises two pairs of arcuate heat exchangers 40a, 40b and 80a, 80b. Each of the first pair of arcuate heat exchangers 40a, 40b is adjacent an end of the stator 34 and extends around the rotor 32. The spaced-apart plates 56a, 56b of each of the pair of arcuate heat exchangers 40a, 40b being so positioned assist in directing the gas flow 38 into contact with the bundle of coolant tubes 42 between the plates. The cooled gas flow 38 then flows as illustrated over the rotor 32, including within the air gap between the rotor and the stator 34, as well as through passageways 47a, 47b, 47c, 47d extending axially through the rotor from the ends thereof and axially outward from the rotor. The gas flow 38 also flows through the stator 34 via passageways 49a, 49b, 49c, 49d extending radially through the stator 34.

Additionally, as illustrated, after the gas flow 38 exits the stator 34, it is cooled by the other pair of arcuate heat exchangers 80a, 80b, each of the arcuate heat exchangers extending around the stator 34. The radially spaced-apart plates 96a, 96b of the heat exchangers 80a, 80b assist in directing the gas flow 38 into contact with the coolant tubes 42 between the respective plates. Accordingly, the gas flow 38 is cooled by the second pair of heat exchangers 80a, 80b before reaching the other pair of heat exchangers 40a, 40b.

An additional aspect of the present invention relates to a method of extracting heat from a gas flow 38 within a generator housing 36 to cool a rotor 32 and a stator 34 surrounding the rotor. The method illustratively comprises positioning at least one arcuate heat exchanger 40a, 80a within the generator housing 36 and causing a coolant to flow within the at least one arcuate heat exchanger to thereby extract heat from the cooling gas flow 38.

The at least one arcuate heat exchanger 40a, 80a so positioned, moreover, illustratively comprises an arcuate heat exchanger that is generally annular. In addition, the method illustratively comprises causing a coolant that is a liquid coolant to flow within the arcuate heat exchanger. The method further illustratively includes positioning at least one arcuate heat exchanger 40a, 80a comprising a bundle 42, 82 of coolant tubes 43, 83 and positioning the bundle of coolant tubes to surround the stator 34 and/or be positioned adjacent an end of the stator.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and other embodiments are intended to be included within the scope of the dependent claims.

That which is claimed is:
1. A dynamoelectric machine comprising:
a rotor defining an axis;
a stator surrounding said rotor;
a generator housing surrounding said rotor and said stator;
a first blower for generating a first cooling gas flow within said generator housing for cooling said stator and said rotor;
a first arcuate heat exchanger within said generator housing and surrounding said stator for extracting heat from the first cooling gas flow, said first arcuate heat exchanger comprising a first bundle of cooling tubes extending in a first plane transverse to the axis; and
a second arcuate heat exchanger within said generator housing and adjacent a first end of said stator for also extracting heat from the first cooling gas flow, said second arcuate heat exchanger comprising a second bundle of cooling tubes extending in a second plane transverse to the axis.

2. A dynamoelectric machine according to claim 1 wherein each of said first and second arcuate heat exchangers is generally annular.

3. A dynamoelectric machine according to claim 1 wherein each of said first and second arcuate heat exchangers comprises a gas-to-liquid arcuate heat exchanger.

4. A dynamoelectric machine according to claim 1 wherein said first arcuate heat exchanger further comprises a pair of radially spaced apart plates adjacent said first arcuate bundle of cooling tubes.

5. A dynamoelectric machine according to claim 1 wherein said second arcuate heat exchanger further comprises a pair of axially spaced apart plates adjacent said second arcuate bundle of cooling tubes.

6. A dynamoelectric machine according to claim 1 wherein each of said first and second arcuate heat exchangers further comprises fins extending outwardly from each coolant tube.

7. A dynamoelectric machine according to claim 1 further comprising:
- a second blower for generating a second cooling gas flow within said generator housing for cooling said stator and said rotor;
- a third arcuate heat exchanger within said generator housing and surrounding said stator for extracting heat from the second cooling gas flow, said third arcuate heat exchanger comprising a third bundle of cooling tubes extending in a third plane transverse to the axis; and
- a fourth arcuate heat exchanger within said generator housing and adjacent a second end of said stator for also extracting heat from the second cooling gas flow, said fourth arcuate heat exchanger comprising a fourth bundle of cooling tubes extending in a fourth plane transverse to the axis.

8. A dynamoelectric machine according to claim 7 wherein said rotor and said stator each comprises passageways therein to pass the first cooling gas flow into the first end of said rotor, through a medial portion thereof, and into and through a medial portion of said stator; and to pass the second cooling gas flow into the second end of said rotor, through a medial portion thereof, and into and through a medial portion of said stator.

9. A method of extracting heat from a first cooling gas flow within a generator housing to cool a rotor and a stator surrounding the rotor, the method comprising:
- positioning a first arcuate heat exchanger within the generator housing and surrounding the stator for extracting heat from the first cooling gas flow, the first arcuate heat exchanger comprising a first bundle of cooling tubes extending in a first plane transverse to an axis defined by said rotor;
- positioning a second arcuate heat exchanger within the generator housing and adjacent a first end of the stator for also extracting heat from the first cooling gas flow, said second arcuate heat exchanger comprising a second bundle of cooling tubes extending in a second plane transverse to the axis; and
- causing a coolant to flow within the first and second arcuate heat exchangers to extract heat from the first cooling gas flow.

10. A method according to claim 9 wherein each of the first and second arcuate heat exchangers is generally annular.

11. A method according to claim 9 wherein causing coolant to flow comprises causing liquid to flow through each of the first and second arcuate heat exchangers.

12. A method according to claim 9 wherein the first arcuate heat exchanger further comprises a pair of radially spaced apart plates adjacent the first arcuate bundle of cooling tubes.

13. A method according to claim 9 wherein the second arcuate heat exchanger further comprises a pair of axially spaced apart plates adjacent the second arcuate bundle of cooling tubes.

14. A method according to claim 9 wherein each of the first and second arcuate heat exchangers further comprises fins extending outwardly from each coolant tube.

* * * * *